Feb. 4, 1969

C. P. RONDEN ET AL 3,425,966
THREE STAGE SUSPENSION POLYMERIZATION
PROCESS FOR VINYL ARYL ARYL MONOMERS
Filed March 1, 1965

INVENTORS
CLIFFORD P. RONDEN
JOHN YU

BY *Jerome Rudy*
ATTORNEY

United States Patent Office 3,425,966
Patented Feb. 4, 1969

3,425,966
THREE STAGE SUSPENSION POLYMERIZATION PROCESS FOR VINYL ARYL MONOMERS
Clifford P. Ronden and John Yu, Edmonton, Alberta, Canada, assignors to The Dow Chemical Company, Midland, Mich., a corporation of Delaware
Filed Mar. 1, 1965, Ser. No. 435,898
U.S. Cl. 260—2.5         15 Claims
Int. Cl. C08f 7/04, 47/08

---

ABSTRACT OF THE DISCLOSURE

Polymeric materials such as polystyrene may be produced in bead form by use of a process involving a three catalyst system and three temperature stages which results in higher viscosity average molecular weight, less residual monomer, greater uniformity and freedom from surface irregularities.

---

Figure 1:
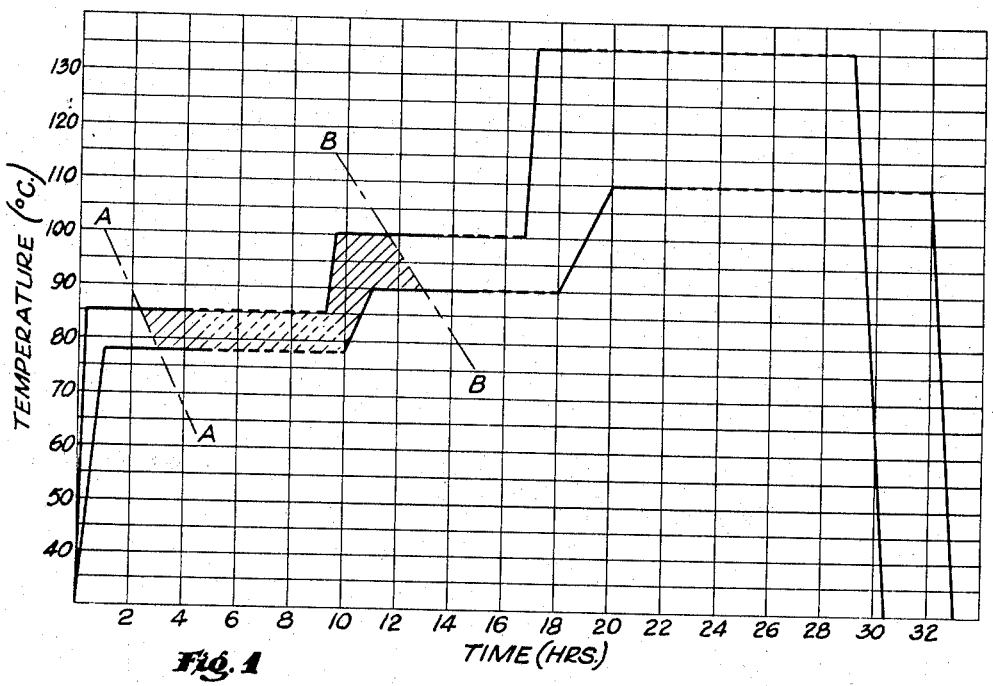

This invention relates to polymerization of vinyl compounds and, more particularly, to an improved suspension polymerization process for producing polymeric products having predetermined physical characteristics. Though not limited thereto, the invention is particularly applicable to the production of foamable polystyrene beads useful for producing cellular products by extrusion or by molding in closed molds.

Prior-art workers have proposed numerous procedures for polymerizing vinyl compounds to obtain the polymer in a particulate form suitable for extrusion or for molding, and such procedures have achieved considerable general success. With accelerated and widened use of vinyl polymers by product fabricators, however, it has been found that the prior-art processes are rarely capable of providing polymeric products having the precise physical characteristics required for particular fabricating operations.

Many fabricating operations, and particularly the production of insulating board and the like by extrusion of foamable polystyrene, require that the polymeric material be in bead form, with the beads generally spherical and of uniform size, exhibiting minimal shrinkage after expansion, and having a predetermined softening point. Such characteristics can be achieved only by suspension polymerization procedures and depend upon a number of process factors which are interrelated in complex fashion. Thus, establishment and maintenance of a stable suspension, first of the monomer, then of the intermediate viscous polymer phase, and finally of the beads, is of critical importance, since failure of the suspension, particularly during the intermediate viscous phase, will result in a wide variation of particle size, failure to achieve substantially spherical particles, and even to complete separation as a result of agglomeration. The specific manner in which polymerization is effected also has a marked effect on particle size and particle configuration, as well as on the molecular weight of the particle and the residual free monomer content. The residual free monomer content of the beads affects shrinkage, softening point and fusion characteristics, and the softening point and fusion characteristics are also markedly affected by the molecular weight of the polymer.

Stated generally, the invention is based upon the observation that the control of the pH of the suspension is extremely critical during a certain phase of the polymerization, and that the necessary close control of the pH of the suspension can be achieved by carrying out polymerization in a particular fashion requiring use of multiple catalysts and a multiple stage heating cycle. Criticality of pH control arises at least in part from the necessity for using an inorganic suspension stabilizing agent, such as tricalcium phosphate, and the tendency for the suspension stabilizing agent to flocculate if the pH descends below a value of 5.8–5.9. During the viscous intermediate phase of the polymerization, when the suspension is most likely to be unstable, even a minor flocculation of the suspension stabilizing agent will at least lead to non-uniformity of bead size, and frequently results in agglomeration of the viscous, partially polymerized product, and separation of the two phases of the suspension. Employing the catalyst systems and polymerization procedures of the prior art, acidic reaction products resulting from catalyst decomposition cause the pH to become too low during the critical stages of polymerization, so that instability of the suspension results and, regardless of the control of other process factors, the desired product characteristics are not attained.

In accordance with the invention, suspension polymerization is carried out with the aid of a plurality of catalysts which act generally sequentially, the catalyst first to act being one which yields basic decomposition products which maintain the pH of the suspension sufficiently high, throughout the viscous intermediate stage of the polymerization, to assure that flocculation of the suspension stabilizing agent will not occur. The subsequently acting catalysts, brought into play by a sequence of successively higher temperatures, are effective to complete polymerization and, in doing so, produce acidic decomposition products which, though significant in quantity, are not adequate to render the suspension so acidic that flocculation of the suspension stabilizing agent occurs.

In practicing the invention, an initial suspension is prepared, typically comprising water, a minor proportion of the inorganic suspension stabilizing agent in submicron particulate form, and the vinyl monomer. In addition, the initial suspension contains a minor proportion of at least one suspension aid selected from the group consisting of the anionic surface active agents and the protective colloids, it being most advantageous to employ both a surface active agent and a protective colloid as described in our copending application Ser. No. 436,324, filed concurrently herewith and now U.S. 3,328,374. The catalysts are preferably added to the suspension immediately before addition of the surface active agent and/or protective colloid. Polymerization is accomplished by the multiple stage heating of the suspension in a carefully controlled time-temperature program.

As the suspension stabilizing agent, any of the water insoluble, finely particulate inorganic colloidal materials can be employed, singly or in combination, particularly including tricalcium phosphate, magnesium oxide, talc (hydrous magnesium silicate), barium sulfate, and mixtures of tricalcium phosphate with lesser proportions of calcium carbonate. The inorganic suspension agent is employed in a proportion amounting to 0.1–0.7% of the weight of the vinyl monomer employed and must be of extremely fine particle size adequate to provide a uniform thixotropic paste when dispersed in a weight of water equal to the weight of the inorganic suspension agent. Thus, superior results are attained when all of the particles of the suspension stabilizing agent are of a size in the range of from markedly smaller than 1 micron to not more than 50 microns.

The vinyl monomer is employed in an amount adequate to provide a monomer-to-water weight ratio not exceeding 1.1:1. The lower limit on monomer content is not critical from the standpoint of operability, but a monomer-to-water weight ratio of at least 0.5:1 is usually required for economical operation of the process.

Any effective anionic surface active agent can be employed, particularly including the naphthalene sulfonates, such as sodium beta naphthalene sulfonate; the alkyl-substituted-naphthalene sulfonates; the water soluble, surface active, anionic soaps of fatty acids, such as sodium oleate; sodium pentadecyl sulfonate; the aryl alkyl polyether sulfonates; sodium propyl phosphate; dodecyl benzene; sodium sulfonate; and equivalent agents.

When a protective colloid is employed, the same can advantageously be a salt of a polyarylic acid, such as sodium polyacrylate. Other suitable protective colloids include polyvinyl pyrrolidone, gelatins, starches, alginates, water-soluble cellulose derivatives of the type of methyl cellulose and hydroxyethyl cellulose, and copolymers of esters of maleic acid, and condensation products of polyethylene glycol and the diglycidyl ether of bisphenol-A described in U.S. Patent No. 3,055,876, issued Sept. 25, 1962, to Leonard C. Grotz.

When an anionic surface active agent is employed, the amount used is in the range of 0.0685–1.2% by weight of the total suspension. When a protective colloid is used, the proportion is 0.000135–0.0017% by weight of the total suspension. Instead of using only a single surface active agent, or only a single protective colloid, combinations of two or more of the agents can be used.

Polymerization of the vinyl monomer is accomplished with the aid of three catalysts which, though incorporated in the initial suspension, act generally in sequence. The three catalysts used are (1) at least one azo compound capable of both initiating polymerization at temperatures below 90° C. and decomposing to produce basic products capable of significantly raising the pH of the suspension, (2) benzoyl peroxide, and (3) at least one free radical initiator which is an organic per compound and has a half-life of 0.1–6.0 hours at 110° C.

While the azo compound employed as the catalyst first to act can be any azo compound which both acts as a polymerization initiator and yields adequately basic decomposition products, the azonitriles are most effective and, of these, azo-bisisobutyronitrile is superior. Other suitable azo compounds include 1,1'-azobiscyclohexanecarbonitrile; azodiisobutyrocarbonamide; and azobis (alpha-ethylbutyro-nitrile).

As the third catalyst, typical suitable compounds are t-butyl perbenzoate, t-butyl peracetate, di-t-butyl diperphtholate, t-butyl peroxy isopropyl carbonate, and 2,5-dimethylhexane-2,5-diperbenzoate. Of these compounds, t-butyl perbenzoate has the advantage of ready availability at reasonable cost, and of being a compound familiar to the art. On the other hand, t-butyl peroxy isopropyl carbonate allows use of lower temperatures in the third stage of polymerization and has proven to be superior from the standpoint of avoiding entrapment of gas bubbles in the polymer beads and eliminating those surface irregularities on the beads which would tend to trap impurities and make washing of the beads difficult.

The three catalysts are employed in proportions such that the total weight of the catalysts amounts to 0.15–0.30% of the weight of vinyl monomer to be polymerized. The azo compound is used in an amount equal to 0.04–0.15%, and advantageously 0.07–0.10%, of the monomer weight. The benzoyl peroxide amounts to 0.02–0.07%, advantageously 0.03–0.04%, of the monomer weight. The free radical initiator having a half-life of 0.1–6.0 hours at 110° C. is used in an amount equal to 0.02–0.20% of the polymer weight. When that compound is t-butyl peroxy isopropyl carbonate, the most advantageous range is 0.04–0.12%, based on the monomer weight. When t-butyl perbenzoate is employed, the most advantageous range is 0.07–0.10% of the monomer weight.

In preparation of the initial suspension, the water is first introduced into an agitator-equipped reaction vessel capable of being sealed and equipped with means for controlling the temperature of the charge over a range up to 135° C. The inorganic suspension stabilizing agent is then introduced, advantageously in the form of a thixotropic paste with water, and is distributed uniformly through the water. The monomer charge is then added, followed by the three catalysts. Finally, the suspension aid or aids are incorporated. Best results are achieved when the water is heated to 35–45° C. preparatory to adidtion of the inorganic suspension stabilizing agent, the suspension then being heated to 60–70° C. as the monomer charge is introduced, the remaining ingredients then being added while the suspension is at 60–70° C. We have found that markedly greater suspension stability is achieved when the water is heated to 35–45° C. before addition of the inorganic suspension agent, and that use of lower temperatures frequently leads to failure of the suspension. While the reasons for this phenomenon are not completely understood, it appears likely that, at least in the case of tricalcium phosphate, the slight solubility of the inorganic compound in water at the higher temperature contributes to stability of the suspension. Attaining a 60–70° C. temperature preparatory to addition of the surface active agent and/or protective colloid aids in dispersing these agents.

The initial suspension having been established polymerization is then accomplished by heating the suspension, with continual agitation under a nitrogen atmosphere and with the reaction vessel sealed, through a 3-stage heating cycle in which each successive cycle promotes the full polymerization effect of a particular one of the three catalysts. The nature of the heating cycle is illustrated in FIG. 1 of the accompanying drawing, which forms a part of this specification. The first stage of polymerization, involving substantially complete expenditure of the azo compound, is carried out by heating the suspension to a temperature in the range of 78–85° C. and holding the suspension at 78–85° C. for a period of 4–9 hours. Ordinarily, a time period of 20–60 minutes is employed to raise the temperature to 78–85° C. At the end of the 4–9 hour period, the suspension is then heated to 90–100° C., again over a period of 20–60 minutes, and held at 90–100° C. for 4–7 hours. At the end of this second 4–7 hour period, the suspension is heated to 110–135° C. and held at 110–135° C. for 2–12 hours, 30–120 minutes usually being required to raise the temperature to the 110–135° C. range. At the end of the 2–12 hour period, the suspension is cooled to room temperature and acidized with hydrochloric acid to a pH of 1, the beads recovered by running the suspension over a screen, and the recovered beads then washed with water and dried in air at 60–85° C.

Referring to FIG. 1 of the accompanying drawings, the critical stage, at which the partially polymerized material is highly viscous and exhibits a strong tendency to coalesce and come out of suspension as a curd-like mass, is indicated between points A—A and B—B and overlaps the first and second stages of the temperature cycle. During this stage, loss of suspension substantially always occurs if the pH is below about 5.9. We have found that, to assure successful operation of the process, the pH of the suspension must be maintained at at least 5.9, and advantageously substantially in excess of 6.0, during the critical stage indicated between A—A and B—B. There is no critical upper limit on the pH of the suspension, the process having been successfully operated with the pH in excess of 8.

In carrying out the process in accordance with the invention, using demineralized water having an initial pH in excess of 6.8, the presence of the catalytic azo compound, which decomposes before and during the critical viscous stage, provides alkaline decomposition products which maintain the pH of the suspension above 6.2 throughout the critical viscous stage, so that the tendency for the partially polymerized material to come out of suspension is obviated.

Figure 2:
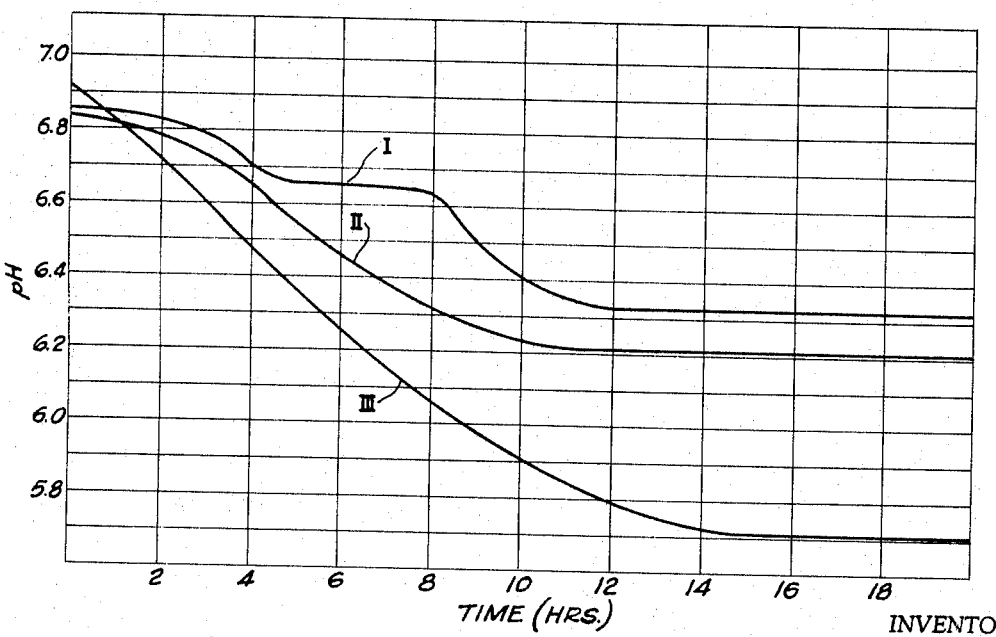

The effect of azo-bisisobutyronitrile on the pH of the suspension when the suspension is subjected to a 3-stage heating cycle in accordance with the invention, with the first stage at 78–85° C., the second at 87–100° C., and the third at 110–135° C., is illustrated in FIG. 2. The run represented by curve I of FIG. 2 was made with azo-bisisobutyronitrile in an amount equal to 0.12% of the weight of styrene monomer, and t-butyl perbenzoate in an amount equal to 0.09% of the monomer weight. The run illustrated by curve II was made with azo-bisisobutyronitrile equal to 0.08% of the monomer weight, benzoyl peroxide equal to 0.04% of the monomer weight, and t-butyl perbenzoate equal to 0.09% of the monomer weight. The third run, represented by curve III, was made with benzoyl peroxide equal to 0.12% of the weight of monomer, and t-butyl perbenzoate equal to 0.09% of the monomer weight. The pH remained at 6.2 or above throughout the entire period of the reaction when azo-bisisobutyronitrile was employed in combination with either benzoyl peroxide or benzoyl peroxide and tertiary butyl perbenzoate. On the other hand, the pH of the suspension dropped below 6.2 in somewhat over 6 hours, and below 6.0 within 9 hours, when the catalyst combination consisted of benzoyl peroxide and tertiary butyl perbenzoate, without the azonitrile.

Employing the three sequentially active catalysts in the foregoing manner with styrene as the vinyl monomer, lower temperatures in the first and second stages of the polymerization cycle provide a polymer with a higher molecular weight, a higher softening point, and a lower residual monomer content, than when the temperatures are selected from the lower portions of the prescribed ranges. Increasing the proportion of the third stage catalyst, and/or increasing the duration of the third heating stage, reduces the residual free monomer content of the finished polymer and, therefore, provides a product having less tendency to distort with heat and, when the product is a foamable one, less tendency toward shrinkage after blowing.

When the invention is practiced to produce foamable polystyrene beads, the beads obtained have a viscosity average molecular weight in excess of 225,000, a shrink temperature for the foamed beads of at least 110° C., and contain not more than 0.2% by weight of free monomer, with at least 80% by weight of the product consisting of beads larger than 840 microns. A viscosity average molecular weight of 245,000 is readily attainable, and the process can be carried out to provide free monomer contents well below 0.1% without difficulty. Maintaining the particle size of virtually all of the product in a range of 420–1410 microns is entirely practical when the aforementioned process conditions are carefully followed. The polystyrene beads obtained in accordance with the invention are free from entrapped air bubbles, a defect which heretofore has plagued polystyrene bead producers. Further, the beads are free from such surface irregularities as would tend to trap minute quantities of the inorganic stabilizing agent, for example, and the product is thus more easily washed free of impurities.

The following examples illustrate the invention:

EXAMPLE 1

A laboratory scale, 10-gallon, glass-lined reaction vessel equipped with a rotary agitator was initially charged with 16.6 parts by weight of demineralized water, 0.242 part by weight of a homogenized thixotropic paste consisting of 50% by weight water and 50% by weight tricalcium phosphate having an average particle size of from less than 1 micron to 50 microns, and 16.6 parts by weight of styrene monomer. With the rotary agitator operated at 220 r.p.m. (which agitation was continued throughout the run), the resulting composition was heated to 30° C. to achieve uniform dispersion of the tricalcium phosphate. To the resulting aqueous dispersion was then added 0.012 part by weight of azo-bisisobutyronitrile (amounting to 0.074% of the styrene monomer), 0.006 part by weight of benzoyl peroxide (amounting to 0.037% of the styrene monomer), and 0.015 part by weight of t-butyl perbenzoate (amounting to 0.090% of the styrene monomer). With the dispersion at slightly more than 40° C., 0.143 part by weight of sodium beta naphthalene sulfonate and 0.077 part by weight of an aqueous solution containing 15% by weight of sodium polyacrylate were then added.

With the reaction vessel closed and sealed, and under a nitrogen atmosphere, the resulting suspension was then heated to 80° C. over a time period of one hour, then held at 80° C. for 6 hours, then heated to 90° C. over a time period of one hour, then held at 90° C. for 5 hours, then heated to 110° C. over a period of 2 hours, and then held at 110° C. for 12 hours.

The reaction vessel was then cooled to room temperature, the suspension acidized to pH 1 with dilute hydrochloric acid, and the polymer beads recovered by running the suspension over a screen. The beads were washed once with water, the washed beads then being dried in air at 60–70° C. for 3 hours.

On sieving, it was found that 97.0% by weight of the beads were larger than 840 microns, 2.2% being smaller than 840 microns and larger than 590 microns, 0.4% being smaller than 590 microns and larger than 420 microns, the remaining 0.4% being smaller than 420 microns. The viscosity average molecular weight of the product was 290,000, and the residual free monomer content was 0.14% by weight. The beads were uniform, spherical, and free of entrapped gas and surface irregularities. With a blowing agent introduced, and foaming carried out, the foamed beads were found to have a shrink temperature of 120–125° C.

EXAMPLE 2

Employing the same equipment, materials and proportions, the procedure of Example 1 was repeated, using a polymerization cycle involving higher temperatures and shorter times. After introduction of the sodium beta naphthalene sulfonate and sodium polyacrylate, and with the reactor closed and sealed, and working under nitrogen, the suspension was heated to 85° C. over a time period of 45 minutes, held at 85° C. for 5 hours, then heated to 100° C. over a period of 30 minutes, held at 100° C. for 4.5 hours, then heated to 120° C. over a period of 20 hours, and held at 130° C. for 4.5 hours.

The polystyrene beads obtained had a viscosity average molecular weight of 268,000, and a residual monomer content of only 0.05% by weight. With a blowing agent introduced, and foaming accomplished, the foamed beads had a shrink temperature of 120–130° C.

EXAMPLE 3

Employing the same equipment and materials, the procedure of Example 1 was repeated. The amount of azo-bisisobutyronitrile employed equaled 0.055% of the weight of styrene monomer, the benzoyl peroxide amounted to 0.055% of the monomer weight, and the t-butyl perbenzoate equaled 0.090% of the monomer weight. The temperature cycle was as in Example 1, except that the third stage temperature was 125° C. and the time for this stage was 6 hours. The recovered polystyrene beads had a viscosity average molecular weight of 273,000, and a residual monomer content of 0.19% by weight. As to particle size, 94% by weight of the beads were larger than 840 microns, 6.6% being between 590 and 840 microns, 1.2% being between 420 and 590 microns, with 0.2% smaller than 420 microns. With a blowing agent introduced and the beads foamed, the shrink temperature of the foamed beads was 110–120° C.

EXAMPLE 4

The procedure of Example 3 was repeated, but with the proportions of azo-bisisobutyronitrile, benzoyl peroxide and t-butyl perbenzoate equal respectively to 0.054%, 0.027% and 0.050% of the weight of styrene monomer. The polystyrene beads had a viscosity average molecular weight of 240,000, and a residual free monomer content of 0.18% by weight. Over 90% by weight of the beads were larger than 590 microns. With a blowing agent added, shrink temperature of the foamed beads was 110–115° C.

EXAMPLE 5

To demonstrate the advantages accruing from the use of an azonitrile in accordance with the invention to maintain a desired relatively high pH, yet accomplish full polymerization, two runs were carried out as precise duplicates of each other save that one (run A) employed azobisisobutyronitrile, benzoyl peroxide, and t-butyl perbenzoate, while the other (run B) employed only benzoyl peroxide and t-butyl perbenzoate. In both runs, the sequential procedure was the same as described in Example 1. In run A, the amounts of azo-bisisobutyronitrile, benzoyl peroxide, and t-butyl perbenzoate were equal to 0.10%, 0.040% and 0.090% of the weight of the styrene monomer charge, respectively. In run B, the amounts of benzoyl peroxide and t-butyl perbenzoate equaled 0.14% and 0.09%, respectively, of the weight of the monomer.

The polymer beads from run A had a residual monomer content of 0.1% by weight, a viscosity average molecular weight of 260,000, and a shrink temperature of 120–130° C. The beads from run B contained 0.2% by weight residual monomer, a viscosity average molecular weight of 205,000, and a shrink temperature of 105–108° C. Of the beads from run A, 92.5% by weight were larger than 590 microns. In run B, only 48.2% of the polystyrene beads were larger than 590 microns.

EXAMPLE 6

The procedure of Example 1 is repeated, but employing azo-bisisobutyronitrile in an amount equal to 0.075% of the styrene monomer weight, benzoyl peroxide in an amount equal to 0.037% of the monomer weight, and t-butyl peroxy isopropyl carbonate in an amount equal to 0.090% of the monomer weight. To accomplish polymerization, the suspension is maintained at 85° C. for 5 hours, then at 100° C. for 4.5 hours, and finally at 130° C. for 4.5 hours. The beads recovered are found to be particularly uniform and free from surface irregularities and are more easily and quickly washed free of impurities than are the beads from Example 1.

EXAMPLE 7

The procedure of Example 1 was repeated, using t-butyl peroxy isopropyl carbonate as the third stage catalyst. The azo-bisisobutyronitrile, benzoyl peroxide and t-butyl peroxy isopropyl carbonate amounted respectively to 0.074%, 0.037% and 0.182% by weight of the styrene monomer employed. The polystyrene beads had a viscosity average molecular weight of 247,000 and a residual monomer content of 0.05% by weight. With a blowing agent introduced, and the beads foamed, the shrink temperature was 120–130° C.

EXAMPLE 8

The procedure of Example 1 was repeated, using 2,5-dimethylhexane-2,5-diperbenzoate as the third stage catalyst, with the duration of the third stage of the heating cycle reduced from 12 hours to 6 hours. The azo-bisisobutyronitrile, benzoyl peroxide and 2,5-dimethylhexane-2,5-diperbenzoate amounted respectively to 0.074%, 0.037% and 0.045% of the weight of styrene monomer employed. The polystyrene beads were in all respects equivalent to those obtained in Example 1.

One of the primary advantages of the present process is that it provides polymer beads which are better suited for the production of foamed products by extrusion than are the polystyrene beads obtained by prior-art methods. Greater suitability for extrusion arises because the beads are larger, in the range of 420–1410 microns, have a higher viscosity average molecular weight, in excess of 225,000, and contain significantly less residual monomer, and the present process provides such beads in an environment which makes possible the introduction of a blowing agent by conventional techniques. Any suitable blowing agent, or combination of blowing agents, can be employed, including the usual liquid hydrocarbons boiling at 30–100° C., such as pentane, hexane, heptane, petroleum ether, cyclohexane, etc. Superior results are obtained with 2-methyl-1-pentene, also known as propylene dimer, as the blowing agent, either alone or in combination with suitable hydrocarbons, as disclosed in our copending application Serial No. (Case 3), filed concurrently herewith. The blowing agent can be introduced into the suspension prior to polymerization, or can be introduced into a suspension of the beads after polymerization. The following example is illustrative.

EXAMPLE 9

Polystyrene beads were produced in accordance with Example 1, all of the beads being in the range of 1190–1410 microns. Employing a glass container capable of being closed and sealed, 110 parts by weight of the beads are introduced, followed consecutively by 0.8 part of tricalcium phosphate. 1.3 parts of sodium beta-naphthalene sulfonate, 1.0 part of a 0.1% aqueous sodium polyacrylate solution, and a mixed blowing composition consisting of 9.35 parts propylene dimer and 2.34 parts petroleum ether. The container was sealed, vigorously shaken, and placed in a constant temperature oil bath at 85° C. for 9 hours, agitation being accomplished by turning the container end-over-end during the 9-hour period. Upon recovery, the beads contained approximately 8.0% by weight of the blowing composition and, after 125 days' storage at room temperature, contained over 6.5% by weight of the blowing composition. The beads expanded spontaneously on heating, attaining a bulk density of 0.73 lb./cu. ft. when heated for 7 minutes in boiling water.

When "shrink temperatures" are mentioned in the foregoing examples, the shrink temperature is obtained by foaming a sample of the beads by heating them in boiling water for 3 minutes, then recovering the foamed beads and determining their bulk density, then dividing the foamed beads into separate samples and heating each such sample at a different selected temperature in the range of 100–130° C. in an air oven for 30 min. Thereafter, the beads are cooled in air to room temperature and the bulk density again determined. The shrink temperature is that temperature at which an appreciable change in bulk density of the foamed beads is observed. For example, if the separate samples are heated to 100°, 105°, 110°, 115° C., respectively, and no change in bulk density is observed in the samples heated to 110° C. or less, but a significant change is noted in the sample heated to 115° C., the shrink temperature is taken as 110–115° C.

The invention is broadly applicable to the polymerization of ethylenically unsaturated monomers capable of being polymerized in suspension, and finds special application to polymerization of vinyl aryl monomers including styrene, the alkyl-substituted styrenes, such as p-methylstyrene, the halogen-substituted styrenes, such as o-chlorostyrene, and vinyl naphthalene.

The embodiments of the invention in which an exclusive property or privilege is claimed are defined as follows:

1. A process for producing polymeric materials in bead form, comprising forming an aqueous suspension containing a vinyl aryl monomer, a finely particulate solid inorganic suspension stabilizng agent and about 0.15 to 0.30% by weight of (1) at least one azo compound (about 0.04 to 0.15% by weight) capable of both acting as a polymerization initiation and producing decomposition products which are alkaline, (2) benzoyl peroxide (about 0.02 to 0.07% by weight), and (3) at least one organic per compound capable of acting as a free radical initiator and having a half-life of 0.1–6.0 hours at 110° C. (about 0.02 to 0.20% by weight); maintaining said suspension at 78–85° C. for 4–9 hours and thereby effecting initial polymerization of said monomer, catalyzed by said azo compound, the alkaline decomposition products from said azo compound causing the pH of said suspension to be materially in excess of 6.0; then maintaining the suspension at 90–100° C. for 4–7 hours and thereby effecting further polymerization, catalyzed by said benzoyl peroxide; then maintaining the suspension at 110–130° C. for 2–12 hours and thereby effecting still further polymerization, catalyzed by said free radical initiator, said benzoyl peroxide and said free radical initiator producing acidic decomposition products tendng to lower the pH of the suspension, the terminal pH of the suspension being at least 5.9 an the suspension being substantially free of flocculated inorganic suspension stabilizing agent at the end of said 2–12 hour period; and recovering the vinyl aryl polymer in bead form.

2. A process according to claim 1, wherein said vinyl monomer is styrene, and the recovered product is polystryene having a viscosity average molecular weight in excess of 225,000, and containing not more than 0.2% by weight of free monomer.

3. A process according to claim 1, wherein said azo compound is azo-bisisobutyronitrile.

4. A process according to claim 2, wherein said azo compound is azo-bisisobutyronitrile in an amount equal to 0.04–0.15% of the weight of the styrene monomer, and said organic per compound capable of acting as a free radical initiator is t-butyl perbenzoate in an amount equal to 0.02–0.20% of the weight of the styrene monomer.

5. A process according to claim 2, wherein said azo compound is azo-bisisobutyronitrile in an amount equal to 0.04–0.15% of the weight of the styrene monomer, and said organic per compound capable of acting as a free radical initiator is t-butyl peroxy isopropyl carbonate in an amount equal to 0.02–0.20% of the weight of the styrene monomer.

6. A process according to claim 4, wherein the amount of t-butyl perbenzoate is equal to 0.07–0.10% of the weight of the styrene monomer.

7. A process according to claim 5, wherein the amount of t-butyl peroxy isopropyl carbonate is equal to 0.04–0.12% of the weight of the styrene monomer.

8. A process according to claim 2, wherein the suspension stabilizing agent is tricalcium phosphate having an average particle size of from smaller than 1 micron to 50 microns, and the pH of the suspension is maintained above 6.2 until at least a substantial portion of the period during which the suspension is maintained at 90–100° C. has elapsed.

9. A process for suspension polymerization of styrene to produce polystyrene beads, comprising forming an aqueous suspension containing styrene monomer and a finely particulate inorganic suspension stabilizing agent; subjecting the styrene monomer to a multiple stage catalytic polymerization commencing with an initial stage during which the active catalyst is an azonitrile (about 0.04 to 0.15% by weight) and the temperature does not exceed 85% C., then, in a second stage during which benzoyl peroxide is the active catalyst (about 0.02 to 0.07% by weight) maintaining the suspension at about 90–100° C. for about 4 to 7 hours and terminating with a final stage during which the temperature is in excess of 100° C. and the active catalyst (about 0.02 to 0.20% by weight) is an organic per compound active as a free radical initiator with a half-life of 0.1–6.0 hours at 110° C.; and recovering the polystyrene beads after said final stage, said azonitrile decomposing to yield alkaline products effective to maintain the pH of the suspension above 6.2 throughout at least the predominant proportion of the polymerization reaction.

10. A process for forming polystyrene beads, comprising forming an initial aqueous suspension containing styrene monomer, a particulate inorganic suspension stabilizing agent having an average particle size from smaller than 1 micron to 50 microns, and a plurality of catalysts including an azonitrile, benzoyl peroxide (about 0.02 to 0.07% by weight), and an organic per compound (about 0.02 to 0.20% by weight) which is a free radical initiator and has a half-life of 0.1–6.0 hours at 110° C., the initial pH of said suspension being markedly in excess of 6.2; maintaining the suspension at 78–85° C. for 4–9 hours and thereby effecting initial polymerization of the styrene with attendant decomposition of said azonitrile to produce alkaline products; then maintaining the suspension at 90–100° C. for 4–7 hours to effect further polymerization catalyzed predominantly by said benzoyl peroxide, with attendant decomposition of the benzoyl peroxide to produce acidic products; then maintaining the suspension at 110–130° C. for 2–12 hours to complete polymerization, with attendant decomposition of said organic per compound to produce additional acidic products; and recovering the polymer beads, said azonitrile being present in an amount equal to at least 0.4% of the weight of the styrene monomer, the total amount of said catalysts not exceeding 0.30% of the weight of the styrene monomer, the alkaline decomposition products from said azonitrile being effective to maintain the pH of the suspension above 6.2 throughout at least most of the polymerization reaction and to prevent the pH of the suspension from falling below 5.9 prior to recovery of the polymer beads.

11. A process according to claim 10, wherein said azonitrile is azo-bisisobutyronitrile and is employed in an amount equal to 0.07–0.10% of the weight of the styrene monomer; said benzoyl peroxide is employed in an amount equal to 0.03–0.04% of the styrene monomer; and said organic per compound is t-butyl perbenzoate and is employed in an amount equal to 0.07–0.10% of the weight of the styrene monomer.

12. A process according to claim 10, wherein said azonitrile is azo-bisisobutyronitrile and is employed in an amount equal to 0.07–0.10% of the weight of the styrene monomer; said benzoyl peroxide is employed in an amount equal to 0.03–0.04% of the styrene monomer; and said organic per compound is t-butyl peroxy isopropyl carbonate and is employed in an amount equal to 0.04–0.12% of the weight of the styrene monomer.

13. A process for producing foamable polystyrene beads suitable for extrusion, comprising forming an initial aqueous suspension containing styrene monomer, a particulate inorganic suspension stabilizing agent, and as catalysts, azo-bisisobutyronitrile, benzoyl peroxide (about 0.02 to 0.07% by weight), and an organic per compound (about 0.02 to 0.20% by weight) which is a free radical initiator and has a half-life of 0.1–6.0 hours at 110° C., the monomer-to-water weight ratio of said suspension not exceeding 1.1:1.0, said suspension stabilizing agent amounting to 0.1–0.4% of the weight of the styrene monomer and having a particle size from smaller than 1 micron to 50 microns, the total weight of said catalysts not exceeding 0.30% of the weight of said styrene monomer and the amount of azo-bisiobutyronitrile employed being 0.04–0.20% of the weight of said styrene monomer; maintaining the suspension at 78–85° C. for 4–7 hours to accomplish an initial polymerization of the styrene catalyzed primarily by said azo-bisisobutyronitrile, said azo-bisisobutyronitrile decomposing to yield alkaline products effective to raise the pH of the suspension; then maintaining the suspension at 90–100° C. for 4–7 hours to accomplish further polymerization of the styrene catalyzed primarily by said benzoyl peroxide; then maintaining the suspension at 110–130° C. for 2–12 hours to accomplish still further styrene polymerization catalyzed primarily by said organic per compound, said benzoyl peroxide and said organic per compound decomposing to yield acidic products tending to lower the pH of the suspension, but the alkaline decomposition products of said azo-bisisobutyronitrile acting to maintain the pH of the suspension above 6.0 and so inhibit flocculation of said suspension stabilizing agent; and recovering the resulting polystyrene in the form of beads which are predominantly larger than 590 microns, have a viscosity average molecular weight in exces of 225,000 and contain not more than 0.2% by weight of styrene monomer, a blowing agent being introduced into the polystyrene.

14. A process according to claim 13, wherein said organic per compound is t-butyl perbenzoate.

15. A process according to claim 13, wherein said organic per compound is t-butyl peroxy isopropyl carbonate.

References Cited

UNITED STATES PATENTS

| 3,143,532 | 8/1964 | Kahrs et al. | 260—93.5 |
| 3,222,343 | 12/1965 | Ingram et al. | 260—93.5 |
| 3,259,595 | 7/1966 | Wright | 260—2.5 |
| 3,280,089 | 10/1966 | Wright | 260—93.5 |

MURRAY TILLMAN, *Primary Examiner.*

WILBERT J. BRIGGS, SR., *Assistant Examiner.*

U.S. Cl. X.R.

260—93.5

UNITED STATES PATENT OFFICE
CERTIFICATE OF CORRECTION

Patent No. 3,425,966                              February 4, 1969

Clifford P. Ronden et al.

It is certified that error appears in the above identified patent and that said Letters Patent are hereby corrected as shown below:

Column 6, line 40, "120° C." should read -- 130° C. --. Column 9, line 61, "85% C." should read -- 85° C. --. Column 10, line 21, "0.4%" should read -- 0.04% --.

Signed and sealed this 7th day of April 1970.

(SEAL)
Attest:

Edward M. Fletcher, Jr.                       WILLIAM E. SCHUYLER, JR.

Attesting Officer                                       Commissioner of Patents